United States Patent
Chamberlain (10) Patent No.: US 6,439,255 B1
(45) Date of Patent: Aug. 27, 2002

(54) VALVE FLAPPER WITH DYNAMIC CIRCUMFERENCE SEAL

(75) Inventor: David Brian Chamberlain, Manchester, NH (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 09/715,404

(22) Filed: Nov. 17, 2000

(51) Int. Cl.[7] ............................................. F16K 25/00
(52) U.S. Cl. ................................. 137/15.25; 251/175
(58) Field of Search ............................... 251/175, 192; 137/15.18, 15.25

(56) References Cited

U.S. PATENT DOCUMENTS

| | | | |
|---|---|---|---|
| 1,860,619 A | * | 5/1932 | Pfau .......................... 251/175 |
| 4,063,709 A | | 12/1977 | Lorthiois |
| 4,248,404 A | | 2/1981 | Goldman |
| 4,290,615 A | | 9/1981 | Etcheverry |
| 4,327,894 A | | 5/1982 | Ewing et al. |
| 4,410,007 A | | 10/1983 | Karpenko |
| 4,632,360 A | | 12/1986 | DeSalve |
| 4,860,994 A | | 8/1989 | Oshima |
| 5,485,542 A | | 1/1996 | Ericson |
| 5,564,679 A | | 10/1996 | Ericson et al. |

FOREIGN PATENT DOCUMENTS

| | | |
|---|---|---|
| DE | 1096134 | 12/1960 |
| DE | 1943985 | 1/1971 |
| EP | 0780610 | 11/1996 |
| GB | 895163 | 5/1962 |
| GB | 983178 | 2/1965 |

OTHER PUBLICATIONS

International Search Report dated Nov. 4, 2002.

* cited by examiner

Primary Examiner—Kevin Lee
(74) Attorney, Agent, or Firm—McDermott, Will & Emery (57) ABSTRACT

A valve assembly including a body defining a passageway having a longitudinal axis, a rotatable shaft extending into the passageway, generally perpendicular to the axis of the passageway, and a flapper secured to the shaft within the passageway and movable upon rotation of the shaft between an opened position and a closed position. The flapper includes a groove in an outer circumference, and a seal is received in the groove. The seal has an outer circumference greater than the outer circumference of the flapper so the entire outer circumference of the seal contacts a wall of the passageway when the flapper is moved to the closed position. The seal also has an inner circumference greater than an inner circumference of the groove of the flapper such that an enclosed space is defined between the seal and the groove. An aperture provides fluid communication between the enclosed space and the passageway.

23 Claims, 6 Drawing Sheets

VALVE FLAPPER WITH DYNAMIC CIRCUMFERENCE SEAL

FIELD OF DISCLOSURE

The present disclosure relates generally to a fluid valve and, more particularly, to a valve assembly for controlling and shutting off fluid flow. Even more particularly, the present disclosure relates to a valve assembly having a flapper with a dynamic circumference seal.

BACKGROUND OF DISCLOSURE

A butterfly, or "flapper" valve generally includes a circular, thin flapper-plate coaxially disposed inside a fluid passageway. A rotatable shaft extends laterally into the passageway and is secured to the flapper plate. Examples of flapper valves are show in U.S. Pat. Nos. 5,485,542 and 5,564,679, which are assigned to the assignee of the present disclosure.

Rotating the shaft, accordingly, causes the flapper plate to be oriented with respect to the passageway so as to control fluid flow there through. The flapper plate is dimensioned, so that when the shaft is rotated until a plane of the flapper is oriented substantially perpendicular to a longitudinal axis of the passageway, the flapper plate assumes a fully closed position and more or less seals the passageway to stop or at least substantially reduce fluid flow. Rotating the shaft until the plane of the flapper is oriented substantially parallel to the longitudinal axis of the passageway, causes the flapper plate to assume a fully opened position. Varying rates of fluid flow through the valve can be permitted depending upon the rotational position of the flapper plate between the fully opened and the fully closed positions.

Some flapper valves have been developed to control rates of fluid flow, in which case the flapper plate need not provide a complete seal in the closed position. Certain other valves, however, are designed to provide a complete shut-off of fluid flow, in which case the circumference of the flapper plate needs to provide a complete seal with the wall of the passageway of the valve.

For a number of reasons, maintaining tight tolerances between the flapper and the inner wall of the passageway can be difficult. In both types of valves, individual parts including the body in which the passageway is formed and the flapper plate are typically made of metal and machined as closely as possible to design dimensions. In shut-off valves, the flapper plate is further provided with a solid, relatively incompressible o-ring around its circumference to provide a complete seal with the wall of the passageway of the valve.

The use of such circumferential o-rings, however, can result in an increase in the force required to rotate the shaft of the flapper valve, and can limit the speed at which the valve can be operated. In addition, operating at relatively high temperatures can result in thermal expansion of the o-rings, thereby increasing the force requirement and decreasing the operational speed. Furthermore, chemistry, pressure and temperature incompatibility of o-ring material can create short life cycles for the o-rings.

The requirement of tight tolerances is especially acute in semiconductor manufacturing, wherein process gases are being controlled at relatively high pressures, at very low rates, and wherein very low conductance at shut-off is required. What is still desired, therefore, is a flapper valve that provides very low conductance at shut-off, even between high pressure differentials, without a significant increase in the force required to operate the flapper valve.

SUMMARY OF DISCLOSURE

The present disclosure, accordingly, provides a valve assembly including a valve body defining a passageway having a longitudinal axis, and a rotatable shaft extending through the body and into the passageway, generally perpendicular to the longitudinal axis of the passageway. A flapper is secured to the shaft within the passageway and movable upon rotation of the shaft between an opened position and a closed position. In the opened position, a plane of the flapper is parallel to the longitudinal axis of the passageway such that allowable fluid flow through the passageway is at a maximum. In the closed position, the plane of the flapper is perpendicular to the longitudinal axis of the passageway, such that fluid flow through the passageway is substantially prevented.

The flapper includes a groove in an outer circumference of the flapper, and an annular seal is received in the circumferential groove. The seal has an outer circumference greater than the outer circumference of the flapper so that the entire outer circumference of the seal contacts a wall of the passageway when the flapper is moved to the closed position. The seal also has an inner circumference greater than an inner circumference of the groove of the flapper such that a space is defined between the inner circumference of the seal and the inner circumference of the groove. The assembly further includes an aperture communicating with the space, such that the seal can be compressed further into the groove when the flapper is moved to the closed position.

According to one aspect of the present disclosure, the seal is metal.

According to another aspect, the seal is continuous, and the aperture providing communication with the enclosed space extends through the flapper.

According to a further aspect, the seal is discontinuous and the aperture providing communication with the enclosed space is defined between ends of the seal.

The valve assembly of the present invention is designed to provide both control and shut-off functions. In particular the assembly is designed to control pressure across a wide dynamic range by reducing the closed conductance through the passageway, and provide sufficient position resolution near the closed position of the flapper to allow controlling this reduced conductance. The presently disclosed valve assembly is also designed to be compatible with a wide array of process chemistries and temperatures, last hundreds of thousands of cycles, and be easily replaced in the field. The valve assembly according to the present disclosure provides all these benefits, yet has a relatively simple design including fewer components that are easier to assembly together during manufacturing.

These and other features and benefits of the present disclosure will become more apparent upon reading the detailed description in combination with the drawings.

BRIEF DESCRIPTION OF DRAWINGS

The foregoing and other features and advantages of this disclosure will be better understood from the detailed description and the drawings, in which.

Like reference characters designate identical or corresponding components and units throughout the several views.

DETAILED DESCRIPTION OF DISCLOSURE

The present disclosure provides a valve assembly that beneficially provides both control and shut-off functions. In particular the assembly is designed to control pressure across a wide dynamic range by reducing the closed conductance. The assembly also provides sufficient position resolution near a closed position of the valve to allow control of the reduced conductance. The presently disclosed valve assembly is further designed to be compatible with a wide array of process chemistries and temperatures, last hundreds of thousands of cycles, and be easily replaced in the field.

Figure 1:
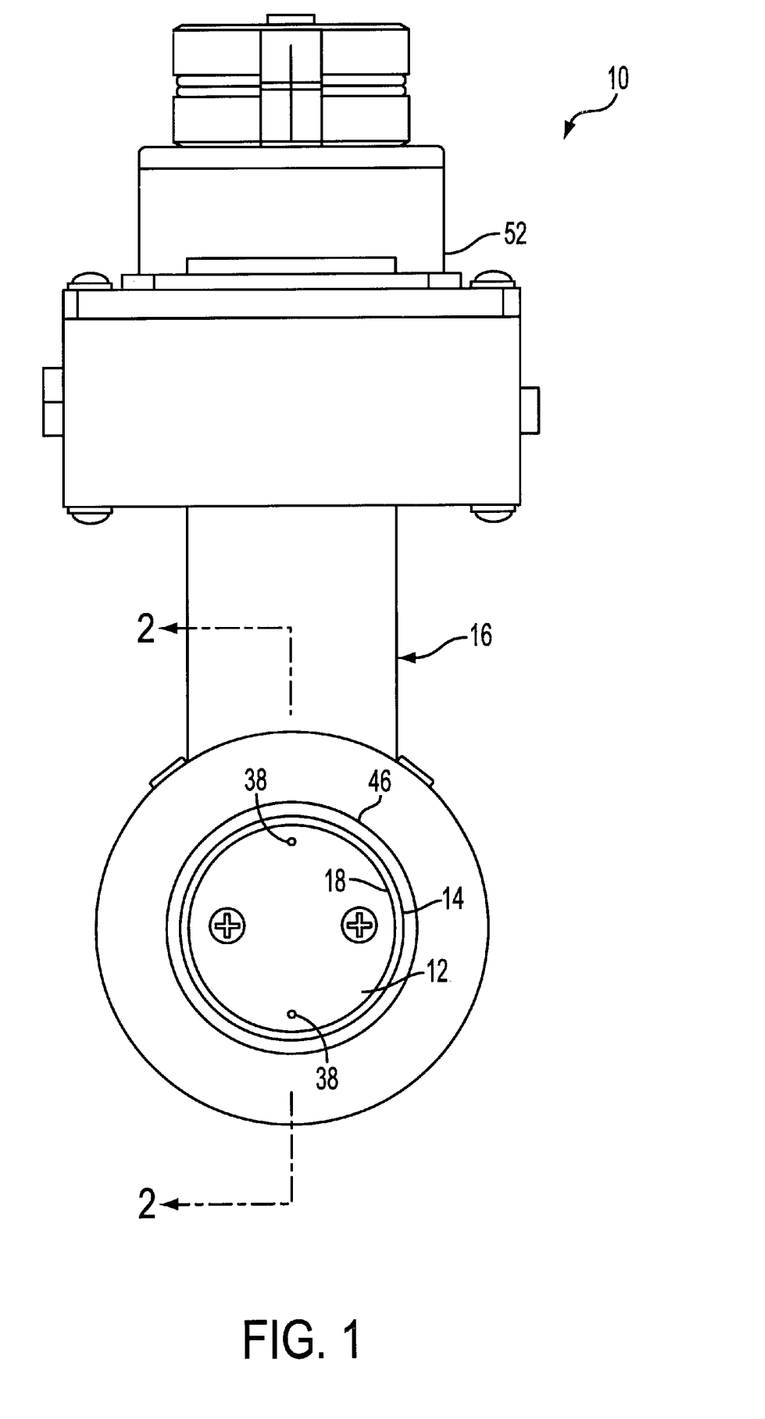
FIG. 1 is an elevation view of a high-pressure side of a valve assembly constructed in accordance with the present disclosure.
Figure 2:
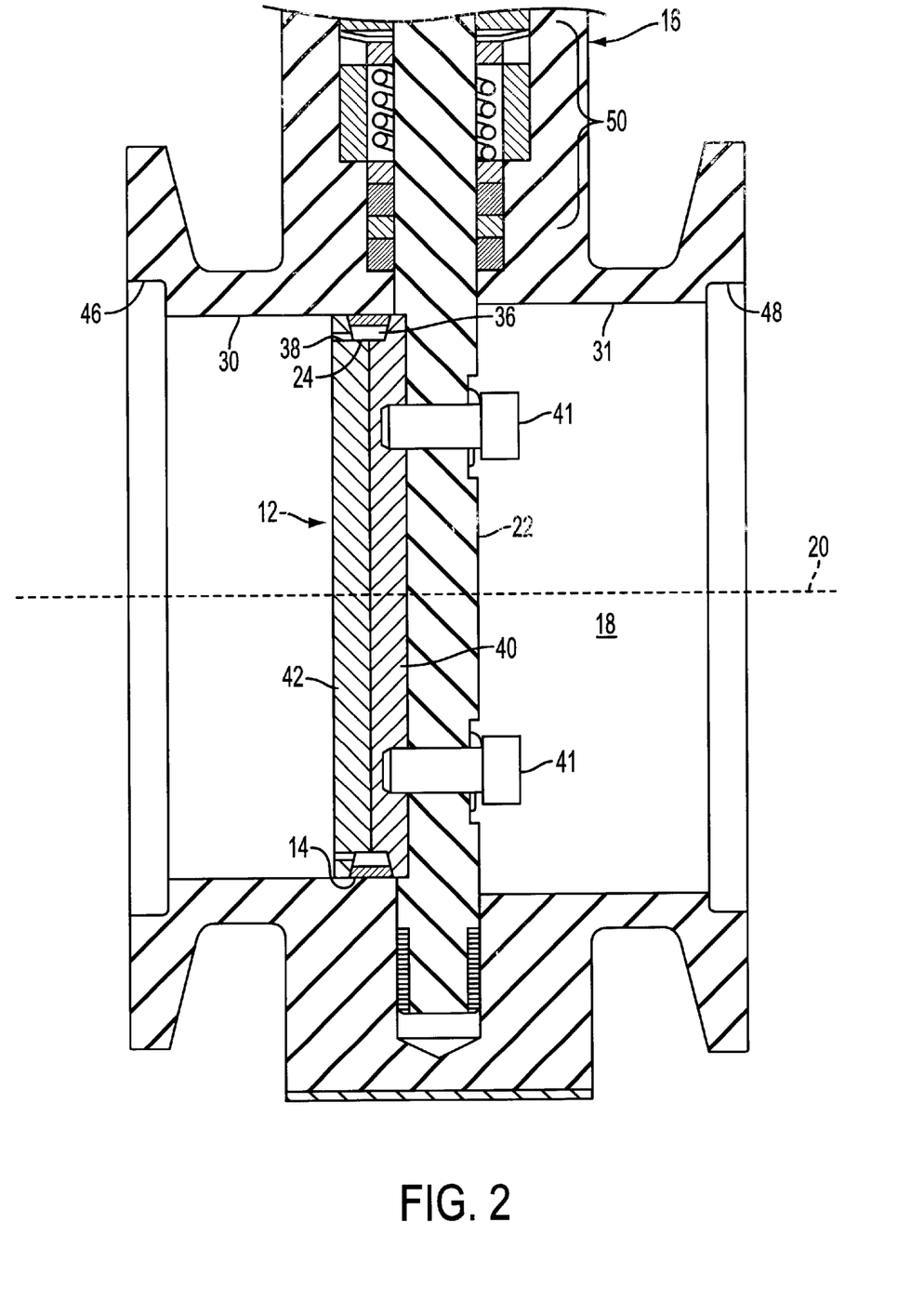
FIG. 2 is an enlarged sectional view of a portion of the valve assembly taken along line 2—2 of FIG. 1, wherein a flapper constructed in accordance with the present disclosure is shown.

More particularly, the present disclosure provides a valve assembly 10 having a flapper 12 with a dynamic circumference seal 14, as shown in FIGS. 1 and 2. The valve assembly 10 is intended, but not limited, for use in controlling the flow of process gases during a semiconductor chip manufacturing process.

The valve assembly 10 includes a valve body 16 defining a passageway 18 having a longitudinal axis 20, and a rotatable shaft 22 extending through the body 16 and into the passageway 18, generally perpendicular to the longitudinal axis 20 of the passageway 18. The flapper 12 is secured to the shaft 22 within the passageway 18 and movable upon rotation of the shaft 22 between an opened position and a closed position. In the opened position (not shown), a plane of the flapper 12 is parallel to the longitudinal axis 20 of the passageway 18 such that allowable fluid flow through the passageway 18 is at a maximum. In the closed position, as shown in FIGS. 1 and 2, the plane of the flapper 12 is perpendicular to the longitudinal axis 20 of the passageway 18 such that fluid flow through the passageway 18 is substantially prevented. The fluid flow rate through the passageway 18 can be further regulated by rotationally positioning the flapper 12 at increments between the fully closed and opened positions, as desired.

Figure 3:
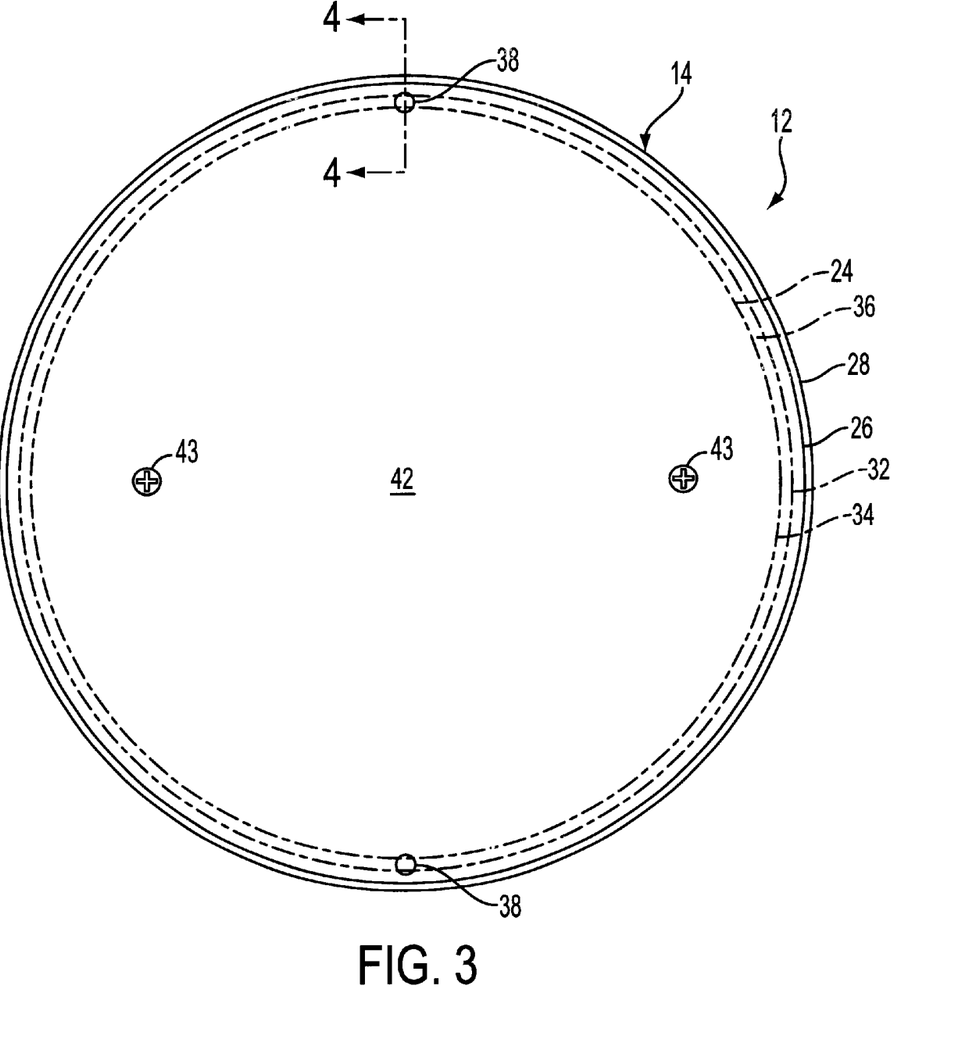
FIG. 3 is an elevation view of a high-pressure side of the flapper of the valve assembly of FIG. 1.
Figure 4:
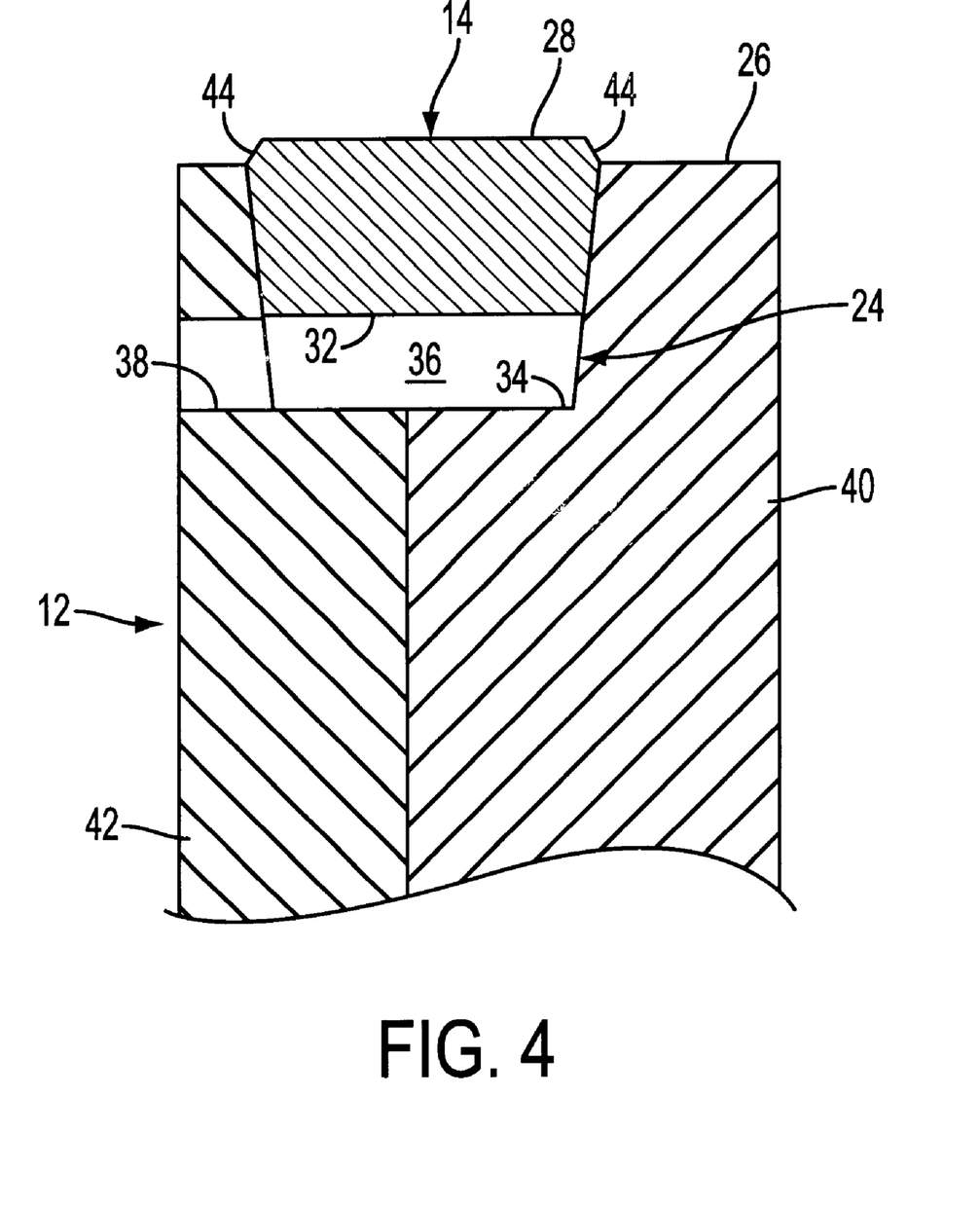
FIG. 4 is an enlarged sectional view of a portion of the flapper of the valve assembly of FIG. 1 taken along line 4—4 of FIG. 3.

As also shown in FIGS. 3 and 4, the flapper 12 includes a groove 24 in an outer periphery 26 of the flapper 12, and a seal 14 is received in the peripheral groove 24. An outer periphery 28 of the seal 14 extends further from the axis 20 of the passageway 18 than the outer periphery 26 of the flapper 12 so that substantially all of the outer periphery 28 of the seal 14 contacts a wall 30 of the passageway 18 when the flapper 12 is moved to the closed position. The seal 14 also has an inner periphery 32 greater than an inner periphery 34 of the groove 24 of the flapper 12 such that an enclosed space 36 is defined between the inner periphery 32 of the seal 14 and the inner periphery 34 of the groove 24. Preferably, the seal 14 is sized with respect to the passageway 18 such that, with the flapper 12 in the fully closed position, the flow rate through the passageway 18 is zero with zero conductance through the valve assembly 10.

The assembly 10 further includes an aperture 38 providing fluid communication between the enclosed space 36 and the passageway 18, such that the seal 14 can be compressed further into the groove 24 when the flapper 12 is moved to the closed position.

The seal 14 is fabricated from a chemically and thermally resistant material that is compatible with the intended range of temperatures, pressures and materials to which the valve assembly 10 is exposed. Similarly, the hardness of the material must be selected for minimizing wear at such temperatures and pressures. The seal 14, therefore, is preferably fabricated from a metal and, even more preferably, from a stainless steel.

Gas vapors are substantially prevented from passing though the valve because of the circumferential seal 14, which is under radial compression between the flapper 12 and the wall 30 of the passageway 18 when the flapper 12 is in the closed position, and thus reduces closed conductance of gas through the passageway 18. The use of the seal 14 thus eliminates the need for tight tolerances on machined parts, and allows accurate control of flow rates when the flapper 12 is near the closed position thereby increasing the overall dynamic range of the valve.

The ability of the seal 14 to be radially compressed into the groove 24 of the flapper 12 is partially related to the thickness of the seal 14, and thus seals of varied thickness' can be substituted to meet various pressure differential requirements. In other words, a thicker seal 14 can be provided for a greater pressure differential through the valve assembly 10.

In the embodiment of FIGS. 1 through 4, the seal 14 is continuous, and the aperture 38 providing communication with the enclosed space 36 comprises two aperture 38 extending through the flapper 12. Preferably, the flapper 12 comprises a base plate 40 secured to the rotatable shaft 22 (with fasteners 41, for example) and a face plate 42 secured to the base plate (with fasteners 43, for example). The groove 24 is defined between the base plate and the face plate.

Preferably, cross-sections of the groove 24 of the flapper 12 and the seal 14 taper inwardly towards the axis 20 of the passageway 18. As best seen in FIG. 3, outermost edges 44 of the seal 14 are beveled to insure a tighter fit with the wall of the passageway 18. The beveled edges allow for improved gas-vacuum conductance across the valve assembly 10 when the flapper 12 is in the closed position. The outer periphery 26 of the flapper 12 is slightly smaller in dimension that the internal diameter 30 of the passageway 18 within which the flapper 12 rotates so that only the seal 14 contacts the wall 30 of the passageway 18, so as to permit easier and quicker rotational movement of the flapper 12 within the passageway 18.

An inlet 46 of the passageway 18 of the valve assembly 10 is typically connected to a process chamber, and an outlet 48 is typically connected to a vacuum pump for evacuating the process chamber. Accordingly, in the intended use of the valve assembly 10 the inlet 46 comprises an upstream, high pressure side, while the outlet 48 comprises a downstream, low pressure side. As shown in FIG. 2, the passageway 18 is provided with two cross-sectional dimensions 30, 31 so that the inlet 46 has a smaller cross-sectional dimension that the outlet 48. In the closed position, the flapper 12 is located in the inlet 46 side of the passageway 18, and the outer periphery 28 of the seal 14 is substantially equal to the inner periphery 30 of the inlet side of the passageway 18. Alternatively, the passageway 18 could be provided with a tapered portion between the inlet and the outlet to act as a valve seat for the flapper 12. In such case the flapper 12 and outer seal 14 could also be tapered to match the tapered valve seat of the passageway 18.

As shown in FIGS. 1 and 2, the face plate 42 faces towards the inlet 46 of the passageway 18, i.e., the high pressure side, when the flapper 12 is in the closed position, and the apertures 38 extend through the face plate.

The passageway 18 and the flapper 12 are preferably provided with circular cross-sections and the seal 14 is annular, but the disclosure is not limited to a passageway 18 having a circular cross-section, and other suitably shaped cross-sections can alternatively be provided.

The flapper 12, the seal 14, at least the wall 30, 31 of the passageway 18, the rotatable shaft 22, and the fasteners 41, 43 all comprise a corrosion-resistant metal or metallic alloy such as stainless steel. The valve assembly 10 also includes suitable packing and bearing assemblies 50 provided between the valve body 16 and the rotatable shaft 22, as shown in FIG. 2. The valve assembly 10 is provided with a suitable means, such as a stepping motor 52, as shown in FIG. 1, for rotating the shaft 22. A linear linkage (not shown) can be provided to couple the motor and the shaft 22 so as to substantially linearize the relationship between the position of the shaft 22 and the flow rate through the valve, as is known by those skilled in the present art. In addition, an electric control circuit for controlling operation of the stepping motor can be provided with a counter for keeping track of the rotational position of the shaft 22.

Figure 5:
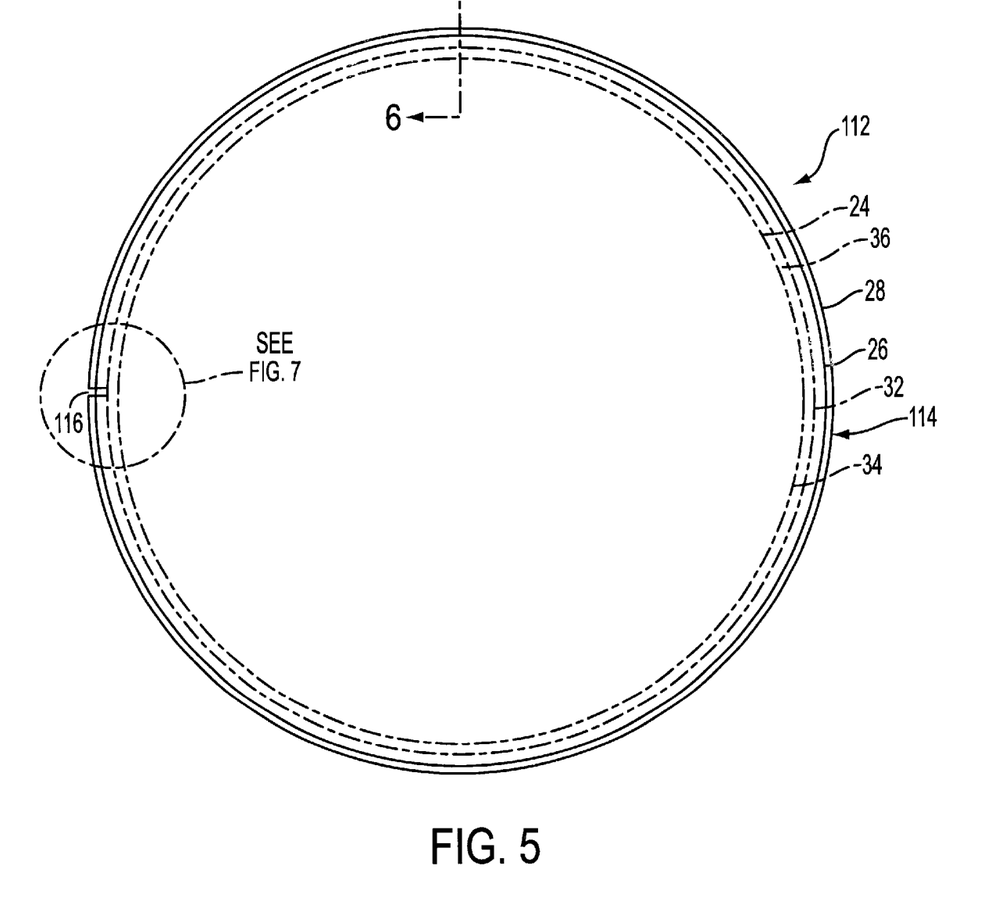
FIG. 5 is an elevation view of a high-pressure side of another flapper constructed in accordance with the present disclosure for use with the valve assembly of FIG. 1.
Figure 6:
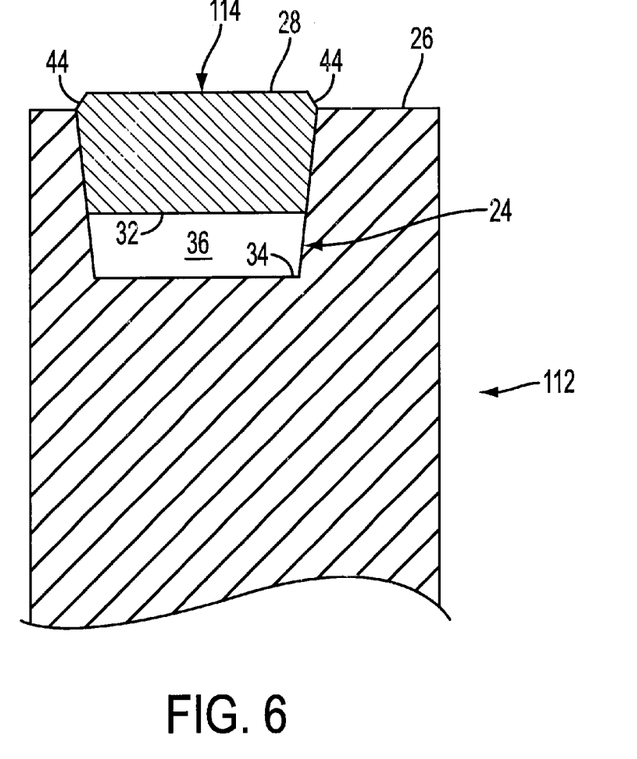
FIG. 6 is an enlarged sectional view of a portion of the flapper of FIG. 5 taken along line 6—6 of FIG. 5.
Figure 7:
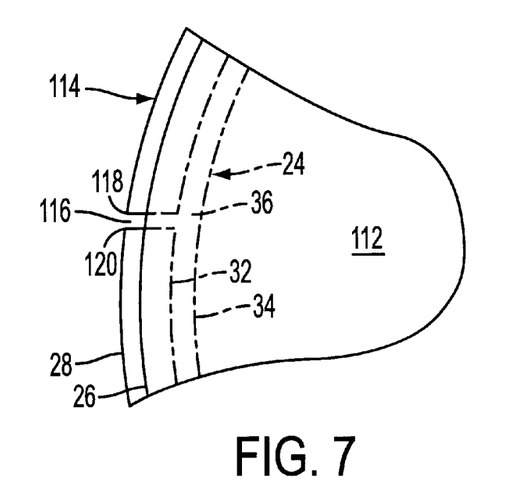
FIG. 7 is an enlarged elevation view of a portion of the flapper of FIG. 5 contained within circle 7 of FIG. 5.

Referring now to FIGS. 5 through 7, another flapper 112 and another seal 114 constructed in accordance with the present disclosure are shown. The flapper 112 and the seal 114 are somewhat similar to the flapper 12 and seal 14 of FIGS. 1 through 4, but the seal 114 of FIGS. 5 through 7 is discontinuous and an aperture 116 providing communication with the enclosed space 36 is defined between ends 118, 120 of the seal 114, as shown best in FIG. 7. In addition, the flapper 112 of FIGS. 5 through 7 is provided as a single piece since the ends 118, 120 of the seal 114 can be pulled apart to allow the seal 114 to be fit around the periphery of the flapper 112 and received in the groove 24 during assembly of the flapper 112 and the seal 114.

The embodiment and practices described in this specification have been presented by way of illustration rather than limitation, and various modifications, combinations and substitutions may be effected by those skilled in the art without departure either in spirit or scope from this disclosure in its broader aspects and as set forth in the appended claims.

What is claimed is:

1. A valve assembly comprising:
   a valve body defining a passageway having a longitudinal axis;
   a rotatable shaft extending through the body and into the passageway, generally perpendicular to the longitudinal axis of the passageway;
   a flapper secured to the shaft within the passageway and movable upon rotation of the shaft between an opened position wherein a plane of the flapper is parallel to the longitudinal axis of the passageway such that allowable fluid flow through the passageway is at a maximum, and a closed position wherein the plane of the flapper is perpendicular to the longitudinal axis of the passageway such that fluid flow through the passageway is substantially prevented, the flapper including a groove in an outer periphery of the flapper;
   a seal received in the peripheral groove of the flapper, an outer periphery of the seal extending further from the axis of the passageway than the outer periphery of the flapper so that substantially all of the outer periphery of the seal contacts a wall of the passageway when the flapper is moved to the closed position, the seal also having an inner periphery extending further from the axis of the passageway than an inner periphery of the groove of the flapper such that an enclosed space is defined between the inner periphery of the seal and the inner periphery of the groove; and
   an aperture providing fluid communication between the enclosed space and the passageway,
   wherein the seal is continuous, and the aperture providing communication with the enclosed space extends through the flapper, and
   the flapper comprises a base plate secured to the rotatable shaft and a face plate secured to the base plate, with the groove defined between the base plate and the face plate.

2. A valve assembly according to claim 1, wherein the seal is metal.

3. A valve assembly according to claim 1, wherein the face plate faces towards an inlet of the passageway when the flapper is in the closed position and the aperture extends through the face plate.

4. A valve assembly according to claim 1, wherein the flapper is a single piece.

5. A valve assembly according to claim 1, wherein outer edges of the seal are beveled.

6. A valve assembly according to claim 1, wherein the passageway and the flapper have circular cross-sections.

7. A valve assembly according to claim 1, wherein an inlet of the passageway has a cross-sectional area less than a cross-sectional area of an outlet of the passageway.

8. A valve assembly comprising:
   a valve body defining a passageway having a longitudinal axis;
   a rotatable shaft extending through the body and into the passageway, generally perpendicular to the longitudinal axis of the passageway;
   a flapper secured to the shaft within the passageway and movable upon rotation of the shaft between an opened position wherein a plane of the flapper is parallel to the longitudinal axis of the passageway such that allowable fluid flow through the passageway is at a maximum, and a closed position wherein the plane of the flapper is perpendicular to the longitudinal axis of the passageway such that fluid flow through the passageway is substantially prevented, the flapper including a groove in an outer periphery of the flapper;
   a seal received in the peripheral groove of the flapper, an outer periphery of the seal extending further from the axis of the passageway than the outer periphery of the flapper so that substantially all of the outer periphery of the seal contacts a wall of the passageway when the flapper is moved to the closed position, the seal also having an inner periphery extending further from the axis of the passageway than an inner periphery of the groove of the flapper such that an enclosed space is defined between the inner periphery of the seal and the inner periphery of the groove; and
   an aperture providing fluid communication between the enclosed space and the passageway, wherein cross-sections of the groove of the flapper and the seal taper inwardly towards the axis of the passageway.

9. A valve assembly according to claim 8, wherein the seal is continuous, and the aperture providing communication with the enclosed space extends through the flapper.

10. A valve assembly according to claim 8, wherein the seal is discontinuous and the aperture providing communication with the enclosed space is defined between ends of the seal.

11. A valve assembly according to claim 8, wherein the flapper is a single piece.

12. A valve assembly according to claim 8, wherein outer edges of the seal are beveled.

13. A valve assembly according to claim 8, wherein the passageway and the flapper have circular cross-sections.

14. A valve assembly according to claim 8, wherein an inlet of the passageway has a cross-sectional area less than a cross-sectional area of an outlet of the passageway.

15. A valve assembly according to claim 8, wherein the seal is metal.

16. A valve assembly according to claim 8, wherein the flapper comprises a base plate secured to the rotatable shaft and a face plate secured to the base plate, with the groove defined between the base plate and the face plate.

17. A valve assembly according to claim 16, wherein the face plate faces towards an inlet of the passageway when the flapper is in the closed position and the aperture extends through the face plate.

18. A valve assembly according to claim 8, wherein the seal is discontinuous and the aperture providing communication with the enclosed space is defined between ends of the seal.

19. A method of controlling fluid flow through a passageway, comprising:

pivoting a flapper within the passageway between an opened position, wherein a plane of the flapper is parallel to the longitudinal axis of the passageway such that allowable fluid flow through the passageway is at a maximum, and a closed position wherein the plane of the flapper is perpendicular to the longitudinal axis of the passageway such that fluid flow through the passageway is substantially prevented;

forming a groove in an outer periphery of the flapper;

positioning a seal in the peripheral groove of the flapper;

extending an outer periphery of the seal further from the axis of the passageway than the outer periphery of the flapper so that substantially all of the outer periphery of the seal contacts a wall of the passageway when the flapper is moved to the closed position;

extending an inner periphery of the seal further from the axis of the passageway than an inner periphery of the groove of the flapper such that an enclosed space is defined between the inner periphery of the seal and the inner periphery of the groove;

providing fluid communication between the enclosed space and the passageway so that the seal can be compressed further into the groove when the flapper is moved to the closed position, wherein cross-sections of the groove of the flapper and the seal are tapered inwardly towards the axis of the passageway.

20. A method according to claim 19, wherein the seal is metal.

21. A method according to claim 19, wherein the seal is continuous and the fluid communication with the enclosed space is provided through the flapper.

22. A method according to claim 19, wherein the seal is discontinuous and the fluid communication with the enclosed space is provided between ends of the seal.

23. A method according to claim 19, wherein outer edges of the seal are beveled.

* * * * *